United States Patent
Milleth et al.

(10) Patent No.: US 9,843,409 B2
(45) Date of Patent: Dec. 12, 2017

(54) MULTIPLE-INPUT MULTIPLE-OUTPUT METHOD FOR ORTHOGONAL FREQUENCY DIVISION MULTIPLEXING BASED COMMUNICATION SYSTEM

(71) Applicants: Centre of Excellence in Wireless Technology, Chennai (IN); Indian Institute of Technology Madras, Chennai (IN)

(72) Inventors: Jeniston Deviraj Klutto Milleth, Chennai (IN); Chandrasekaran Mohandoss, Chennai (IN); Sendilramkumar Devar, Chennai (IN); Thulasiram Jonna, Chennai (IN); Abhijeet Masal, Chennai (IN); Bhaskar Ramamurthi, Chennai (IN)

(73) Assignees: CENTRE OF EXCELLENCE IN WIRELESS TECHNOLOGY, Chennai, TN (IN); INDIAN INSTITUTE OF TECHNOLOGY, MADRAS, Chennai, TN (IN)

( * ) Notice: Subject to any disclaimer, the term of this patent is extended or adjusted under 35 U.S.C. 154(b) by 107 days.

(21) Appl. No.: 15/152,392

(22) Filed: May 11, 2016

(65) Prior Publication Data
US 2016/0337156 A1    Nov. 17, 2016

(30) Foreign Application Priority Data
May 15, 2015    (IN) .............................. 2468/CHE/2015

(51) Int. Cl.
H04L 27/26    (2006.01)
H04J 11/00    (2006.01)
H04B 7/06    (2006.01)
H04L 1/00    (2006.01)
H04L 5/00    (2006.01)
H04L 25/03    (2006.01)

(52) U.S. Cl.
CPC ........ *H04J 11/0056* (2013.01); *H04B 7/0619* (2013.01); *H04L 1/00* (2013.01); *H04L 5/0023* (2013.01); *H04L 27/2601* (2013.01); *H04L 2025/03426* (2013.01)

(58) Field of Classification Search
CPC .................. H04L 27/2626; H04L 2025/03426
USPC .......................................... 375/295
See application file for complete search history.

(56) References Cited

U.S. PATENT DOCUMENTS 8,233,559 B2 * 7/2012 Ko ........................ H04L 5/005
                                              375/267
8,885,744 B2 * 11/2014 Kadous ................ H04B 7/0417
                                              375/267

(Continued)

*Primary Examiner* — Michael Neff

(57) ABSTRACT

Embodiments herein provide a Multiple-Input Multiple-Output (MIMO) method for a communication system in general, and more particularly to an Orthogonal Frequency Division Multiplexing (OFDM) based communication system to serve more than one receivers on the same resources. The method includes selecting, by a transmitter, a plurality of precoder matrices for a plurality of receivers from a predefined codebook of precoders, where the plurality of precoder matrices is dynamically cycled within an allocated resource. Further, the method includes transmitting, by the transmitter, a symbol vector precoded with the plurality of precoder matrices over MIMO channel associated with the plurality of receivers.

28 Claims, 5 Drawing Sheets

(56) References Cited

U.S. PATENT DOCUMENTS

| | | | | |
|---|---|---|---|---|
| 2010/0272206 A1* | 10/2010 | Mazzarese | ............ | H04B 7/0417 375/267 |
| 2014/0029650 A1* | 1/2014 | Park | .................... | H04B 7/0604 375/219 |
| 2014/0179334 A1* | 6/2014 | Forenza | ................. | H04B 7/024 455/452.2 |

* cited by examiner

MULTIPLE-INPUT MULTIPLE-OUTPUT METHOD FOR ORTHOGONAL FREQUENCY DIVISION MULTIPLEXING BASED COMMUNICATION SYSTEM

FIELD OF INVENTION

The present invention generally relates to a Multiple-Input Multiple-Output (MIMO) method for a communication system and more particularly to a mechanism for selecting a plurality of precoders for a plurality of receivers selected from a predefined codebook of precoders for an Orthogonal Frequency Division Multiplexing (OFDM) based communication system to serve more than one receiver on same resources. The present application is based on, and claims priority from an Indian Application Number 2468/CHE/2015 filed on 15 May 2015, the disclosure of which is hereby incorporated by reference.

BACKGROUND

In a typical radio communications system, user communications terminals referred to as User Equipment's (UEs) communicate via. Radio Access Network (RAN) with other networks like Internet. The RAN covers a geographical area which is divided into cell areas, with each cell area being served by a Base Station (BS), e.g., a radio BS (RBS), which in some networks is also called a "NodeB" or enhanced Node B (i.e., eNodeB or eNB).

In conventional methods and systems, MIMO techniques are used to increase capacity of a wireless system without increasing bandwidth and power consumption. This is achieved by multiplexing the data of multiple users over spatial channels, when multiple antennas are made available at a transmitter and a receiver. The number of independent data streams that can be multiplexed is limited by a minimum number of antennas at the transmitter and receiver. Thus, multiplexing gain that can be achieved in a single user MIMO system is limited by the number of antennas at the receiver due to its form factor. In order to overcome the limitation as described above, the conventional methods and systems considers the multiple antennas available at multiple UEs as a larger MIMO system. The signals to be transmitted should be precoded preferably with orthogonal precoders, or otherwise, there can be a leakage from co-scheduled user signals at the receiver. As there are multiple users in the system, the limitation can be on the number of antennas available at the transmitter.

Due to the advancement of smart antenna technologies, an active antenna with large number of antenna elements can be arranged in two dimensional arrays at the transmitter. Further, the entire or a subset of the antenna elements can be configured to form a directional beam and can create multiple directional beams. Generally, placing large number of antennas at the transmitter is a common setup in Massive or Full Dimensional MIMO (FD-MIMO) systems. Therefore, it is possible to exploit the capacity of such large multi-user MIMO (MU-MIMO) system using appropriate transmission technique, and other related supporting features like precoders, reference signals, signaling, Channel Quality Indicator (CQI), measurement, feedback, link adaptation, and receivers.

In general, closed-loop MU-MIMO system requires Channel State Information (CSI) at the transmitter (CSIT) to form a beam directed to the receiver. The same precoding information plays a crucial role in pairing the receivers during scheduling for the closed-loop multi-user system. Achieving full CSIT in a Frequency Division Duplex (FDD) system is nearly impractical, and also in a Time Division Duplex (TDD) system, where the channel reciprocity holds, the challenge is different like channel estimation from the contaminated signals at the reference signal locations due to interference. Even achieving the partial CSIT with large number of active users will lead to affect the uplink throughput because of the overhead in a feedback channel In addition, the closed loop operation demands high coherence time (i.e., low mobility) in order to suite the channel conditions with the reported CSI.

In the conventional methods and systems, when the receiver is not moving or moving at a slow speed, the receiver estimates the channel and the precoder; and reports the estimated precoder to the transmitter. After receiving the precoder, the transmitter utilizes the precoder for its data transmission. Consider a scenario where the receiver is moving at a higher speed. If the receiver estimates and reports the precoder to the transmitter then by the time the transmitter receives the precoder and applies it, the channel of the receiver changes thus making the reported precoder meaningless.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a MIMO system and method thereof for a communication system in general, and more particularly to an OFDM based communication system to serve more than one receivers on the same resources without full channel feedback to the transmitter.

Another object of the embodiments herein is to provide a MIMO system and method thereof for selecting a plurality of precoder matrices for a plurality of receivers selected from a predefined codebook of precoders, where the plurality of precoder matrices is dynamically cycled within an allocated resource.

Yet another object of the embodiments herein is to provide a MIMO system and method thereof for transmitting a symbol vector precoded with the plurality of precoder matrices over MIMO channel associated with the plurality of receivers.

Accordingly, the embodiments herein provide a MIMO method for a communication system in general, and more particularly to an OFDM based communication system to serve more than one receivers on same resources. The method includes selecting, by a transmitter, a plurality of precoder matrices for a plurality of receivers from a predefined codebook of precoders, where the plurality of precoder matrices is dynamically cycled within an allocated resource. Further, the method includes transmitting, by the transmitter, a symbol vector precoded with the plurality of precoder matrices over MIMO channel associated with the plurality of receivers.

In an embodiment, a precoder matrix from the plurality of precoder matrices is allocated to a receiver from the plurality of receivers based on at least one of a predefined pattern known to the receiver, a pattern signaled to the receiver, and any other pattern.

In an embodiment, the plurality of precoder matrices is dynamically cycled at one of a sub-carrier level and a group of sub-carrier level within the allocated resource.

In an embodiment, the plurality of precoder matrices is based on at least one of a predefined pattern known to the plurality of receivers, a pattern signaled to the plurality of receivers, and any other pattern.

In an embodiment, the symbol vector to be transmitted on the sub-carrier is obtained by encoding data using a forward error correcting code.

In an embodiment, the transmitter uses feedback about at least one of a Channel Quality Indicator (CQI), a Precoding Matrix Indicator (PMI) and a rank received from the plurality of receivers to resource allocation.

In an embodiment, the transmitter is selecting and pairing the plurality of receivers based on at least one of a CQI criterion and a PMI criterion, where the plurality of receivers use the same allocated resources.

In an embodiment, the CQI criterion is the plurality of receivers having one of same modulation and an approximately same CQI.

In an embodiment, the PMI criterion is the plurality of receivers having one of an orthogonal precoder matrix and a non-orthogonal precoder matrix having a less Euclidean distance.

In an embodiment, the predefined codebook of precoders is one of a full codebook and a subset of a codebook.

In an embodiment, the orthogonal precoder matrix is one of a Discrete Fourier Transform (DFT) matrix precoder and a Walsh Hadamard matrix precoder.

In an embodiment, a size of the precoder matrix depends on a number of receivers paired and a number of data streams to the plurality of receivers.

In an embodiment, the number of data streams to each of the receiver is preferred to be same.

In an embodiment, where the transmitter signals at least one of the number of paired receivers and the number of data streams to the plurality of receivers.

In an embodiment, each of the receivers uses at least one of the number of paired receivers, the number of data streams, the precoder cycle pattern, and a modulation technique, to suppress the interference.

Accordingly the embodiments herein provide a MIMO system for a communication system in general, and more particularly to an OFDM based communication system to serve more than one receiver on same resources. The MIMO system including a transmitter including a memory, a processor coupled to the memory. The processor is configured to select a plurality of precoder matrices for a plurality of receivers from a predefined codebook of precoders, where the plurality of precoder matrices is dynamically cycled within an allocated resource. Further, the processor is configured to transmit a symbol vector precoded with the plurality of precoder matrices over MIMO channel associated with the plurality of receivers.

In an embodiment, the receiver is configured to estimate channel based on one of a precoded reference signal and a non-precoded reference signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
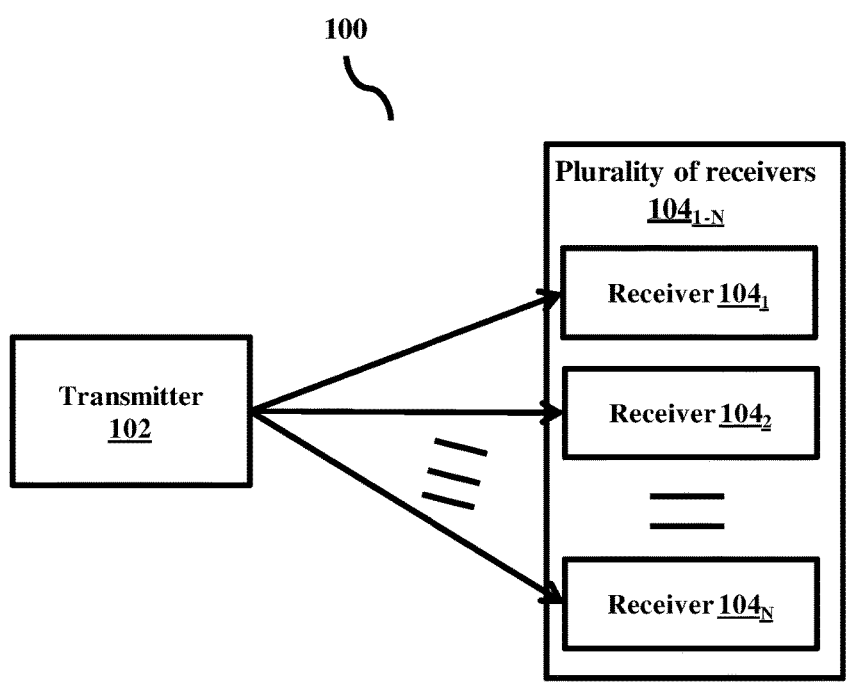
FIG. 1 illustrates a high level overview of a MIMO system for an OFDM based communication system for transmitting a symbol vector, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a MIMO method for a communication system and more particularly to a mechanism for selecting a plurality of precoders for a plurality of receivers selected from a predefined codebook of precoders for an OFDM based communication system to serve more than one receiver on same resources. The method includes selecting, by a transmitter, a plurality of precoder matrices for a plurality of receivers selected from a predefined codebook of precoders, where the plurality of precoder matrices is dynamically cycled within an allocated resource. Further, the method includes transmitting, by the transmitter, a symbol vector precoded with the plurality of precoder matrices over MIMO channel associated with the plurality of receivers.

Unlike conventional methods and systems, the proposed MIMO method for the OFDM based communication system utilizes the plurality of precoders within the allocated resource shared between the receivers without having a full CSIT. Thus, reducing signaling overhead and also selects the precoders in such a way to suppress the inter-user or inter-stream interference.

The OFDM based cellular communication system with large number of antennas deployed at the transmitter is considered. Also, there are receivers with one or more antenna elements are considered.

Referring now to the drawings, and more particularly to FIGS. 1 through 6, where similar reference characters denote corresponding features consistently throughout the figures, there are shown preferred embodiments.

FIG. 1 illustrates a high level overview of a MIMO system 100 for an OFDM based communication system, according to an embodiment as disclosed herein. In an embodiment, the MIMO system 100 includes a transmitter 102 and a plurality of receivers $104_{1-N}$ (hereafter referred as the receiver(s) 104). In an example, the transmitter 102 can be a base station. In an example, the receiver 104 can be a UE, a Mobile Terminal, or the like.

The transmitter 102 can be configured to select a plurality of precoder matrices for the receiver 104 selected from a predefined codebook of precoders, where the plurality of precoder matrices is dynamically cycled within an allocated resource. In an embodiment, the plurality of precoder matrices is dynamically cycled at one of a sub-carrier level and a group of sub-carrier level within the allocated resource based on a predefined pattern known to the receiver 104, a pattern signaled to the receiver 104, or any other pattern. In an embodiment, the allocated resource is common to the receiver 104. In an embodiment, the predefined codebook of precoders is a full codebook or a subset of a codebook. Further, the predefined codebook of precoders includes unitary matrix precoders or non-unitary matrix precoders.

In an example, the unitary matrix precoder is preferred for defining the predefined codebook of precoders for dynamically cycling the plurality of precoder matrices so that the precoder matrices between the receivers 104 or between the data streams of the receiver 104 are orthogonal. However, the non-unitary matrix based precoders can also be used with a graceful degradation in performance In an example, the unitary matrix precoder is a Discrete Fourier Transform (DFT) matrix precoder or a Walsh Hadamard matrix precoder. In an embodiment, a size of the precoder matrix depends on the number of receivers 104 paired and the number of data streams to the receiver 104. In an example, the number of data streams can be made same to the receiver 104 in order to reduce the signaling overhead.

Further, the transmitter 102 can be configured to transmit a symbol vector precoded with the plurality of precoder matrices over the MIMO channel associated with the receiver 104. In an embodiment, the symbol vector to be transmitted on the sub-carrier is encoded using a forward error correcting code. The forward error correcting code in the OFDM based cellular communication system exploits the frequency diversity in the MIMO system 100 created due to the dynamic cycling of the plurality of precoder matrices. In an embodiment, a precoder matrix from the plurality of precoder matrices is allocated to a receiver (i.e., receiver $104_1$) from the receiver 104 based on a predefined pattern known to the receiver 104, a pattern signaled to the receiver 104, or any other pattern.

In an embodiment, the transmitter 102 uses feedback about at least one a CQI, a PMI, a rank received from the receiver 104, or combination of same to perform resource allocation. Further, the transmitter 102 can be configured to select and pair the receiver 104 based on a CQI criterion, a PMI criterion, or combination of same. In an example, the transmitter 102 can be configured to pair the receiver $104_1$, the receiver $104_2$, and the receiver $104_3$ based on the CQI criterion, the PMI criterion, or combination of same. In an embodiment, the CQI criterion is the receiver 104 having same modulation or an approximately same CQI. In an embodiment, the PMI criterion is the receiver 104 having one of an orthogonal precoder matrix and a non-orthogonal precoder matrix having a less Euclidean distance. In an embodiment, the transmitter 102 signals at least one of the number of paired receiver 104 and the number of data streams to the receiver 104.

In an embodiment, each receiver in the receiver 104 is configured to estimate channel based on a precoded reference signal or a non-precoded reference signal. In an example, in Long Term Evolution (LTE) standards, a precoded or a non-precoded channel state information reference signals (CSI-RS) can be defined or existing definition can be appropriately modified to estimate the channel. In case of the non-precoded reference signal, initially, the raw channel is estimated, and the precoded channel is obtained by selecting the appropriate precoders used in the subcarriers or the group of subcarriers, which can be used for data detection. In the case of the precoded reference signal, the estimated channel is the effective channel that includes the precoder matrix applied before transmission, and it can be used directly for the data detection. In case of the LTE, this can be applied by configuring multiple CSI-RS processes for each precoder matrix used.

The FIG. 1 shows a limited overview of the MIMO system 100 but, it is to be understood that another embodiment is not limited thereto. Further, the MIMO system 100 can include different units communicating among each other along with other hardware or software components.

Figure 2:
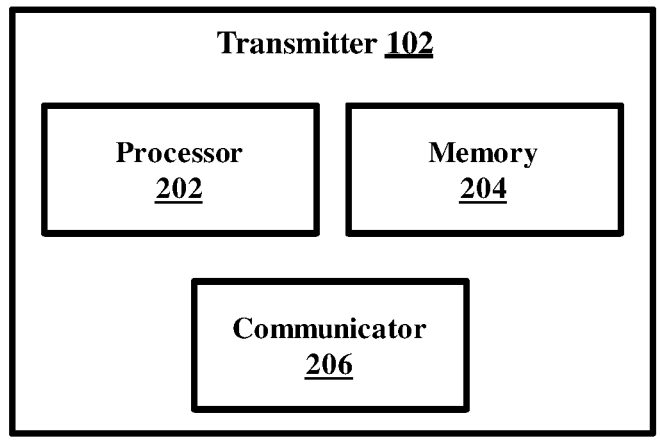
FIG. 2 illustrates various units of a transmitter, according to an embodiment as disclosed herein.

FIG. 2 illustrates various units of the transmitter 102, according to an embodiment as disclosed herein. In an embodiment, the transmitter 102 includes a memory 202, a processor 204, and a communicator 206.

The memory 202 may include one or more computer-readable storage media. The memory 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In some examples, the memory 202 can be configured to store larger amounts of information than the memory. In certain examples, a non-transitory storage medium may store data that can, over time, change (e.g., in Random Access Memory (RAM) or cache).

The processor 204 can be configured to select the plurality of precoder matrices for the receiver 104 from the predefined codebook of precoders, where the plurality of precoder matrices is dynamically cycled within the allocated resource. The plurality of precoder matrices is dynamically cycled at the sub-carrier level or the group of sub-carrier level within the allocated resource. In an embodiment, the plurality of precoder matrices is dynamically cycled based on the pattern known or signaled to the receiver 104. In an embodiment, the predefined codebook of precoders is the full codebook or the subset of the codebook. In an example, the orthogonal precoder matrix is the DFT matrix precoder, the Walsh Hadamard matrix precoder, or the like. In an embodiment, the size of the precoder matrix depends on the number of receiver 104 paired and the number of data streams to the receiver 104.

Further, the processor 204 can be configured to transmit the symbol vector precoded with the plurality of precoder matrices over the MIMO channel associated with the receiver 104. In an embodiment, the symbol vector to be transmitted on the sub-carrier is obtained by encoding the data using the forward error correcting code. In an embodiment, the precoder matrix from the plurality of precoder matrices is allocated to the receiver 104 based on the pattern known or signaled to the receiver 104.

In an embodiment, the processor 204 can be configured to use the feedback about the CQI, the PMI, the rank received from the receiver 104, or combination of same to perform the resource allocation. Further, the processor 204 can be configured to select and pair the receiver 104 based on the CQI criterion, the PMI criterion, or combination of same, where the receiver 104 use the same allocated resources. In an example, the number of paired users or the number of data streams to different receivers are signaled to the receiver 104 when they are not predefined. In an example, when the rank and the number of paired receivers are same, then the link adaptation will be a direct conversion to Modulation and Coding (MCS). Otherwise, appropriate CQI offset should be provided before selecting the MCS. In an embodiment, the CQI criterion is the receiver 104 having same modulation or the approximately same CQI.

In another embodiment, the information such as the number of paired receivers, the number of data streams to different receiver, and the precoder cycle pattern to different receivers can be used in the receiver 104 (For example, Successive Interference Cancellation (SIC) based equalizers) design to suppress the inter-user or the inter-stream interference by knowing the total number of interferences.

In an embodiment, the PMI criterion is the receiver 104 having one of the orthogonal precoder matrix and the non-orthogonal precoder matrix having the less distance. In an embodiment, the processor 204 signals the number of paired receivers and the number of data streams to the receiver 104. In an example, the precoder matrix including the plurality of columns belonging to the open-loop precoder cycling codebook of precoders. Further, the plurality of columns of the precoder depends on the number of paired receivers. The communicator 206 can be used to communicate internally with the units and externally with network entities.

The FIG. 2 shows various units of the transmitter 102 but, it is to be understood that another embodiment is not limited thereto. Further, the transmitter 102 can include different units communicating among each other along with other hardware or software components.

Figure 3:
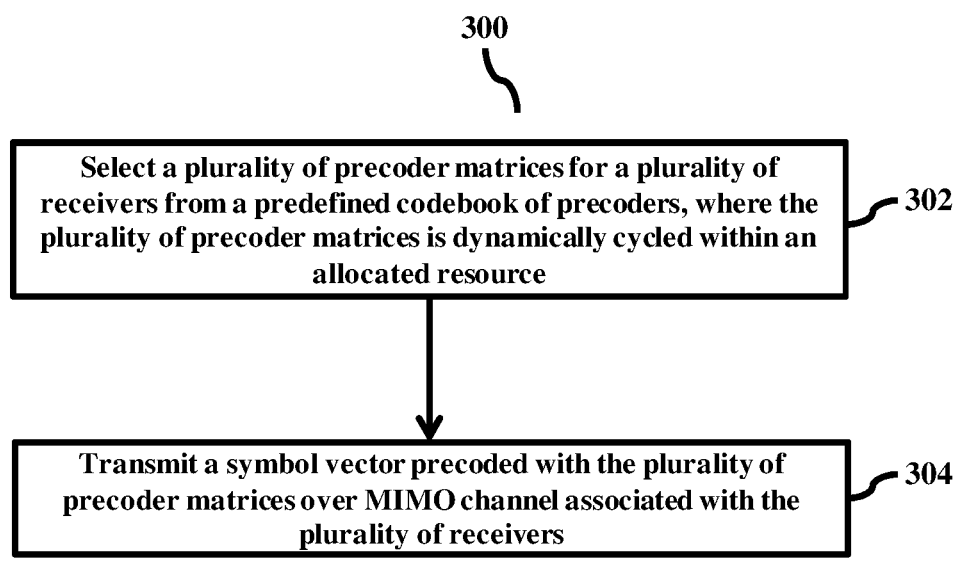
FIG. 3 is a flow diagram illustrating a MIMO method for an OFDM based communication system for transmitting a symbol vector, according to an embodiment as disclosed herein.

FIG. 3 is a flow diagram 300 illustrating the MIMO method for the OFDM based communication system for transmitting the symbol vector, according to an embodiment as disclosed herein. At step 302, the method includes selecting the plurality of precoders for the receiver 104 selected from the predefined codebook of precoders. The method allows the transmitter 102 to apply the plurality of precoders for the receiver 104 selected from the predefined codebook of precoders. The plurality of precoders is dynamically cycled within the allocated resource.

At step 304, the method includes transmitting the symbol vector precoded with the plurality of precoder matrices over the MIMO channel associated with the receiver 104. The method allows the transmitter 102 to transmit the symbol vector precoded with the plurality of precoder matrices over the MIMO channel associated with the receiver 104.

The various actions, acts, blocks, steps, and the like in method may be performed in the order presented, in a different order or simultaneously. Further, in some embodiments, some actions, acts, blocks, steps, and the like may be omitted, added, modified, skipped, and the like without departing from the scope of the invention.

Figure 4:
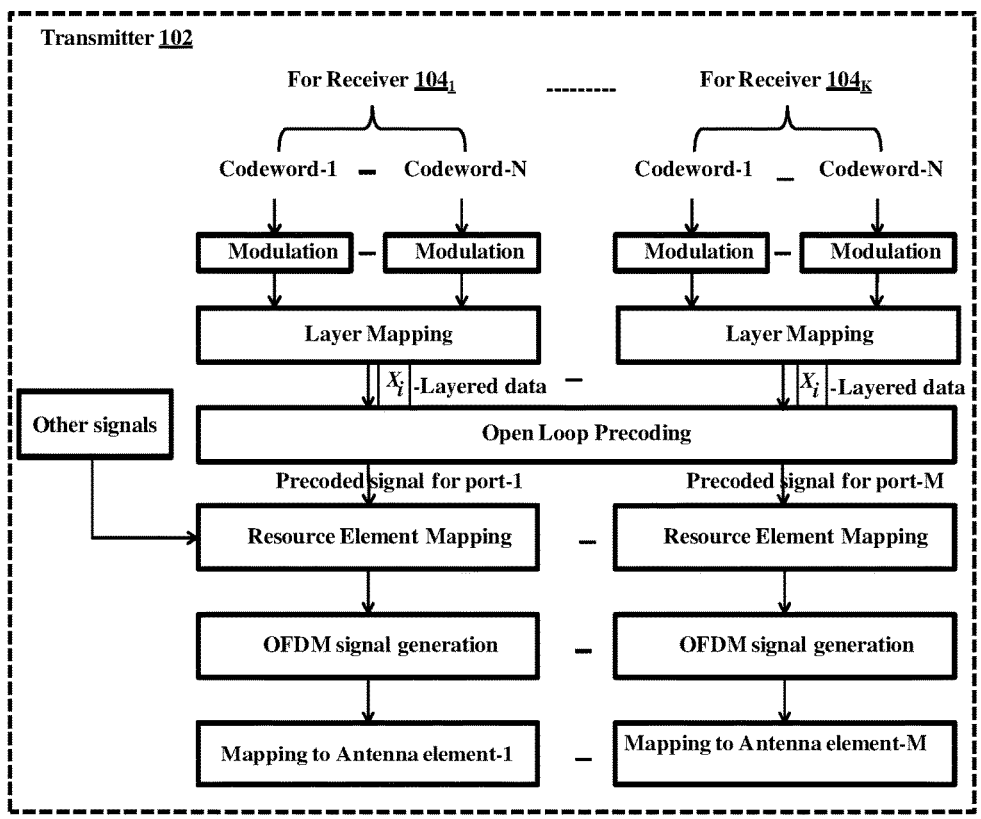
FIG. 4 illustrates a physical layer processing of a transmitter, according to an embodiment as disclosed herein.

FIG. 4 illustrates a physical layer processing of the transmitter 102, according to an embodiment as disclosed herein. In an embodiment, the conventionally known elements are not described as to not unnecessarily obscure the embodiments herein. As shown in the FIG. 4, in order to transmit the symbol vector precoded with the plurality of precoder matrices over the MIMO channel associated with the receivers $104_1$ to $104_K$, below described physical layer processing is performed by the transmitter 102.

For receivers $104_1$ to $104_K$ as shown in the FIG. 4, the transmitter 202 includes a data source (not shown) which provides data bits to an error control coding block (not shown). The error control coding block encodes the data using the forward error correcting code. After receiving the data bits, the error control coding block (for example, a turbo-coder) provides code words (i.e., code word-1 to code word-N) to one or more modulation blocks, where the received data is modulated onto a plurality of symbols. Further, the modulation blocks provide the symbols to the layer mapping block, where the layer mapping block generates layered data (Xi) based on the number of streams or layers assigned to the receivers $104_1$ to $104_K$.

Further, the layer mapping block provides the generated layered data to an open loop precoding block. Here, "M" precoder matrices are selected from the predefined codebook of precoders based on the transmission rank of the transmitter 102. The selected "M" precoder matrices are used in the open loop precoding block to precode the symbol vectors generated by the layer mapping block. In an example, consider a scenario where symbol vectors $S_1$-$S_M$ are generated by the layer mapping block and are provided to the open loop precoding block. The symbol vectors $S_1$-$S_M$ are precoded using the precoder matrices $W_1$-$W_M$ to generate the precoded symbol vectors $X_1$-$X_M$.

Further, the precoded symbol vectors are provided to a resource element mapping block. In addition to the precoded symbol vectors, the resource element mapping block also receives physical layer signals (for example: Reference signals). Further, the detailed description of the open loop precoding block and the resource element mapping block is explained in conjunction with FIG. 5. Further, the symbol vectors are provided to an OFDM signal generator block. The output of the OFDM signal generator blocks is mapped to antenna elements 1 to M as shown in the FIG. 4.

The various blocks in method may be performed in the order presented, in a different order or simultaneously. Further, in some embodiments, some of the blocks may be omitted, added, modified, skipped, or the like without departing from the scope of the invention.

Figure 5:
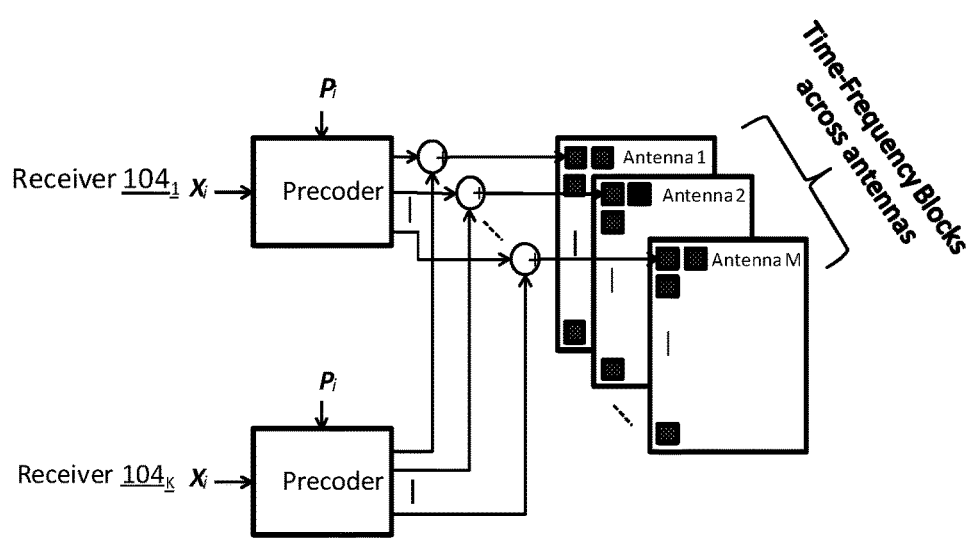
FIG. 5 illustrates an open loop precoding process and resource element mapping process, according to an embodiment as disclosed herein.

FIG. 5 illustrates an open loop precoding process and resource element mapping process as described in the FIG. 4, according to an embodiment as disclosed herein. Consider a scenario where the transmitter 102 requires sending the precoded symbol vectors to the receivers $104_1$ to $104_K$. For each of the receiver 104, the precoder matrix 'Pi' with size M×L, where "L" is the number of layers and "M" is the number of antenna elements is utilized.

The multi-layer symbol vector "Xi" with size L×1 is precoded by the matrix 'Pi'. In an embodiment, for different receivers, the matrix 'Pi' is selected such that they exhibit orthogonality or very low correlation. Each of the precoder is mapped to the antenna elements 1 to M. In an embodiment, the antenna elements 1 to M use the time resource blocks as shown in the FIG. 5. The output of the precoder for all the receivers 104₁ to 104_K are added and fed to the OFDM signal generator. For different receivers, the matrix "Pi" is selected from the predefined codebook of precoders. In an example, consider a scenario where the transmitter 102 needs to transmit the precoded symbol vector to the receiver 104₁ and the receiver 104₂. As the number of receivers is two, the precoder matrix 'Pi' is represented below:

$$\begin{pmatrix} P_{11} & P_{21} \\ P_{12} & P_{22} \end{pmatrix}$$

Further, the multi-layer symbol vector "Xi" is represented below:

$$\begin{pmatrix} X_1 \\ X_2 \end{pmatrix}$$

The output of the precoder for the receiver 104₁ and the receiver 104₂ are added. The added output of the precoder is represented below:

$$\begin{pmatrix} P_{11} & P_{21} \\ P_{12} & P_{22} \end{pmatrix} \begin{pmatrix} X_1 \\ X_2 \end{pmatrix} = \begin{pmatrix} P_{11}X_1 + P_{21}X_2 \\ P_{12}X_1 + P_{21}X_2 \end{pmatrix}$$

The output "$P_{11}X_1+P_{21}X_2$" is mapped to the antenna element-1 and the output "$P_{12}X_1+P_{22}X_2$" is mapped to the antenna element-2.

Figure 6:
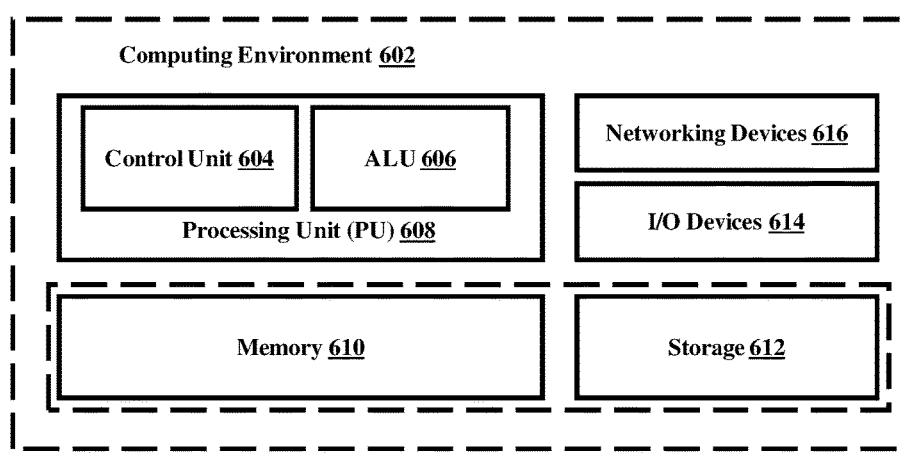
FIG. 6 illustrates a computing environment implementing a MIMO method for an OFDM based communication system, according to embodiments as disclosed herein.

FIG. 6 illustrates a computing environment implementing the MIMO method for the OFDM based communication system, according to embodiments as disclosed herein. As depicted in the figure, the computing environment 602 comprises at least one processing unit 608 that is equipped with a control unit 604 and an Arithmetic Logic Unit (ALU) 606, a memory 610, a storage unit 612, plurality of networking devices 616 and a plurality Input output (I/O) devices 614. The processing unit 608 is responsible for processing the instructions of the technique. The processing unit 608 receives commands from the control unit in order to perform its processing. Further, any logical and arithmetic operations involved in the execution of the instructions are computed with the help of the ALU 606.

The overall computing environment 602 can be composed of multiple homogeneous and/or heterogeneous cores, multiple CPUs of different kinds, special media and other accelerators. The processing unit 608 is responsible for processing the instructions of the technique. Further, the plurality of processing units 608 may be located on a single chip or over multiple chips.

The technique comprising of instructions and codes required for the implementation are stored in either the memory unit 610 or the storage 612 or both. At the time of execution, the instructions may be fetched from the corresponding memory 610 or storage 612, and executed by the processing unit 608.

In case of any hardware implementations various networking devices 616 or external I/O devices 614 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 to 6 include blocks which can be at least one of a hardware device, or a combination of hardware device and software unit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A Multiple-Input Multiple-Output (MIMO) method for an Orthogonal Frequency Division Multiplexing (OFDM) based communication system, the method comprising:
    selecting, by a transmitter, a plurality of precoder matrices for a plurality of receivers, wherein the plurality of precoder matrices is dynamically cycled within an allocated resource, wherein a size of each of the precoders matrix depends on a number of receivers paired and a number of data streams for each of the receivers; and
    transmitting, by the transmitter, a symbol vector precoded with the plurality of precoder matrices over MIMO channel associated with the plurality of receivers.

2. The MIMO method of claim 1, wherein a precoder matrix from the plurality of precoder matrices is allocated to a receiver from the plurality of receivers based on at least one of a predefined pattern known to the receiver and a pattern signaled to the receiver.

3. The MIMO method of claim 1, wherein the plurality of precoder matrices is dynamically cycled at one of a sub-carrier level and a group of sub-carrier level within the allocated resource based on at least one of a predefined pattern known to the plurality of receivers and a pattern signaled to the plurality of receivers.

4. The MIMO method of claim 3, wherein the symbol vector to be transmitted on the sub-carrier is obtained by encoding using a forward error correcting code.

5. The MIMO method of claim 1, wherein the transmitter uses feedback about at least one of a Channel Quality Indicator (CQI), a Precoding Matrix Indicator (PMI), and a rank received from the plurality of receivers to perform resource allocation.

6. The MIMO method of claim 5, wherein the transmitter is selecting and pairing the plurality of receivers based on at least one of a CQI criterion and a PMI criterion, wherein the plurality of receivers use the same allocated resources.

7. The MIMO method of claim 6, wherein the CQI criterion is the plurality of receivers having one of same modulation and an approximately same CQI.

8. The MIMO method of claim 6, wherein the PMI criterion is the plurality of receivers having one of an orthogonal precoder matrix and a non-orthogonal precoder matrix having a less distance.

9. The MIMO method of claim 8, wherein the orthogonal precoder matrix is one of a Discrete Fourier Transform (DFT) matrix precoder and a Walsh Hadamard matrix precoder.

10. The MIMO method of claim 1, wherein the number of data streams to each of the receivers are same.

11. The MIMO method claim 1, wherein the transmitter signals at least one of the number of paired receivers and the number of data streams to the plurality of receivers.

12. The MIMO method of claim 1, wherein the plurality of precoder matrices are selected from a predefined codebook of precoders.

13. The MIMO method of claim 12, wherein the predefined codebook of precoders is one of a full codebook and a subset of a codebook.

14. A Multiple-Input Multiple-Output (MIMO) system for an Orthogonal Frequency Division Multiplexing (OFDM) based communication system, the MIMO system comprising:
a transmitter comprising:
a memory;
a processor, coupled to the memory, configured to:
select a plurality of precoder matrices for a plurality of receivers, wherein the plurality of precoder matrices is dynamically cycled within an allocated resource, wherein a size of each of the precoders matrix depends on a number of receivers paired and a number of data streams for each of the receivers; and
transmit a symbol vector precoded with the plurality of precoder matrices over MIMO channel associated with the plurality of receivers.

15. The system of claim 14, wherein a precoder matrix from the plurality of precoder matrices is allocated to a receiver from the plurality of receivers based on at least one of a predefined pattern known to the receiver and a pattern signaled to the receiver.

16. The system of claim 14, wherein the plurality of precoder matrices is dynamically cycled at one of a sub-carrier level and a group of subcarrier level within the allocated resource based on at least one of a predefined pattern known to the plurality of receivers and a pattern signaled to the plurality of receivers.

17. The system of claim 16, wherein the symbol vector to be transmitted on the sub-carrier is obtained by encoding data using a forward error correcting code.

18. The system of claim 14, wherein the transmitter uses feedback about at least one of a Channel Quality Indicator (CQI), a Precoding Matrix Indicator (PMI), and a rank received from the plurality of receivers to perform resource allocation.

19. The system of claim 14, wherein the transmitter is selecting and pairing the plurality of receivers based on at least one of a CQI criterion and a PMI criterion, wherein the plurality of receivers use the same allocated resources.

20. The system of claim 19, wherein the CQI criterion is the plurality of receivers having one of same modulation and an approximately same CQI.

21. The system of claim 19, wherein the PMI criterion is the plurality of receivers having one of an orthogonal precoder matrix and a non-orthogonal precoder matrix having a less distance.

22. The system of claim 21, wherein the orthogonal precoder matrix is one of a Discrete Fourier Transform (DFT) matrix precoder and a Walsh Hadamard matrix precoder.

23. The system of claim 14, wherein the number of data streams to each of the receivers are same.

24. The system of claim 14, wherein the transmitter signals at least one of the number of paired receivers and the number of data streams to the plurality of receivers.

25. The system of claim 24, wherein each of the receivers uses at least one of the number of paired receivers, the number of data streams, the precoder cycle pattern, and a modulation technique, to suppress the interference.

26. The system of claim 14, wherein the receiver is configured to estimate channel based on one of a precoded reference signal and a non-precoded reference signal.

27. The system of claim 14, wherein the plurality of precoder matrices are selected from a predefined codebook of precoders.

28. The system of claim 27, wherein the predefined codebook of precoders is one of a full codebook and a subset of a codebook.

* * * * *